United States Patent Office 3,738,979
Patented June 12, 1973

3,738,979
O$^2$,2'-CYCLOCYTIDINE-3'-PHOSPHATE AND
PROCESS FOR PRODUCING SAME
Joseph Nagyvary, Byran, Tex., assignor to the United
States of America as represented by the Secretary,
Department of Health, Education, and Welfare
No Drawing. Filed Oct. 23, 1969, Ser. No. 868,913
Int. Cl. C07d 51/52
U.S. Cl. 260—211.5                  9 Claims

ABSTRACT OF THE DISCLOSURE

A novel process for preparing O$^2$,2'-cyclocytidine-3' phosphate, a new compound, and aracytidine-3' phosphate, a known compound, is described.

---

In one of the major procedures leading to 1-β D-arabinosyl cytosine (Walwick et al., Proc. Chem. Soc., 84 (1959) O$^2$,2'-cyclocytidine-3',5'-diphosphate appears as an intermediate. The significance of 1-β D-arbinosyl cytosine as a carcinostatic and anti-viral agent is well documented (Hunter, U.S. Pat. No. 3,116,282) and (Cohen, S. S., Progress in Nucleic Acid Research and Molecular Biology, Academic Press, New York, vol. 5, p. 2 (1966). However, O$^2$,2'-cyclocytidine-3' phosphate is a potential drug per se and also an important intermediate in the synthesis of several potential drugs, for example, polyarabinocytidylates. The antileukemic activity of O$^2$,2'-cyclocytidine-3' phosphate has been tested on mice and has been found to have approximately the same therapeutic index as arabinosylcytosine (ara-C) which has a similar structure. The procedure for synthesizing O$^2$,2'-cyclocytidine-3' phosphate also can be used to synthesize aracytidine-3 phosphate which exhibits an activity similar to 1-β-D-arabinocyl cytosine (Smith et al., J. Med. Chem., 10, 774 (1967). It is also important to note that O$^2$,2'-cyclocytidine-3' phosphate is converted to arabinosylcytosine (ara-C) in vivo. This has been determined by experiments with the compound in human blood. O$^2$,2'-cyclocytidine-3 phosphate can be administered orally to mice.

The basic concept underlying the synthesis of the new compound O$^2$,2'-cyclocytidine-3' phosphate is the thermal rearrangement of fully dialkyl or trialkylsilylated cytidine-2',3-cyclic phosphate.

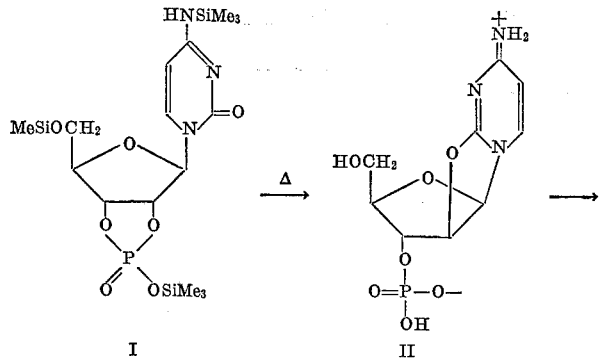

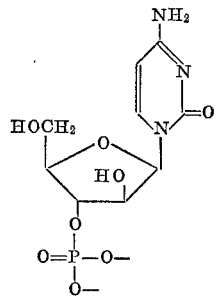

I        II        III

PREPARATION OF O$^2$,2'-CYCLOCYTIDINE-3' PHOSPHATE (FORMULA II)

(1) Dissolve cytidine-2',3'-cyclic phosphate in the form of its tri-n-butylammonium salt in a mixture of a non-protolytic solvent such as pyridine and an excess of a tertiary base such as tri-n-butylamine.

(2) Heat the mixture of 40–120° C. while slowly adding an excess of trimethylsilylating agent such as trimethylsilyl chloride.

(3) Concentrate in vacuo and stir with ice.

(4) Extract the excess base with petroleum ether.

(5) Evaporate the aqueous phase in vacuo in the cold under repeated additions and evaporation of the non-protolytic solvent.

(6) Extract the resulting resin with ether and purify.

Purification may be accomplished by dissolving the resin in cold water, adjusting the pH to 5.5 with pyridine and passing the resulting solution through a Dowex 1–X2 (acetate) resin column. The effluent is freeze-dried and the residue extracted with ether and crystallized from water-acetone. A number of modifications of the isolation and purification procedure are feasible. For example, the product may be obtained without ion exchange filtration by merely precipitating and crystallizing the product, although a lower yield is thus obtained.

Any non-protolytic solvent may be used in this process. Suitable solvents include pyridine, dioxane, dimethyl formamide, dimethylsulfoxide, etc. Other trimethylsilylating agents other than trimethylsilyl chloride may also be used with the exception of hexamethyl disilazane. In general, any trialkylsilyl and dialkylsilyl donor is suitable which does not generate ammonia or primary amines. Concentration of the reactants is not critical, merely an excess of silylating agent and base is necessary. A wide range of temperatures from 40°–120° C. can be employed with appropriate changes in reaction time.

PREPARATION OF ARACYTIDINE-3' PHOSPHATE (FORMULA III)

Aracytidine-3' phosphate can be obtained by titrating O$^2$,2' - cyclocytidine-3' phosphate with dilute NaOH or KOH to pH 10. This produces a quantitative conversion of the starting material to aracytidine-3' phosphate. Aracytidine-3' phosphate can also be obtained directly by using the procedure for the preparation of O$^2$,2'-cyclocytidine-3' phosphate in which case instead of stirring the reaction mixture with ice alone (step 3) the reaction mixture is poured into a mixture of KOH and ice.

Example I.—Preparation of O$^2$,2'-cyclocytidine-3' phosphate

Cytidine-2',3'-cyclic phosphate obtained from 3.3 g. (10 moles) of 2'(3')-cytidylic acid by any of the usual methods, for example according to Michelson (J. Chem. Soc., 3655 (1959), in the form of its tri-n-butyl ammonium salt, is dissolved in a mixture of 10 ml. pyridine and 10 ml. tri-n-butylamine. This solution is heated to 80° C. under the dropwise addition of 6 ml. of trimethylsilyl chloride during five minutes, whereafter it is heated for another thirty minutes. The solution is concentrated to half in vacuo and stirred with about 30 g. of ice for 10 minutes. The excess base is extracted with two 30 ml. portions of petroleum ether and the aqueous phase evaporated in vacuo in the cold under repeated additions and evaporation of dry pyridine. The resulting gum is extracted three times with 30 ml. ether, dissolved in cold water and, after the pH is adjusted to 5.5 with pyridine, the solution is passed through a 20 ml. Dowex 1-X2 (acetate) resin column. The resin is washed with 50 ml. water at 5° C. and the effluent freeze dried. The residue is extracted with water and then crystallized from water-acetone (2.1 g.). Additional amounts of the product were obtained by eluting the resin with 0.02 M acetic acid (0.3 g.). The product thus obtained migrates as a homogenous spot on electrophoresis in 0.03 M phosphate, pH 7.0; mobility 0.8 relative to cytidine-2',3'-cyclic phosphate. Paper chromatographic mobility in ethanol—0.5 M ammonium acetate (pH 7) 5:2 is identical to cytidine-2'(3')-phosphate. Upon recrystallization from water-acetone and drying at room temperature, 0.01 mm. for 8 hours over $P_2O_5$, the elementary analysis gave C, 33.47; H, 4.44; N, 12.90; P, 9.8% (by titration) calculated for

$C_9H_{12}N_3O_7P \cdot H_2O$ (M.W. 323.20): C, 33.45; H, 4.35; N, 13.01; P, 9.60%. $UV_{max}$ 231 (9,550), 262.5 (10,640) m$\mu$; $\lambda_{min}$ 243 m$\mu$ (6,480) in water pH 1-7. Characteristic IR frequencies (cm.$^{-1}$): 1665, 1376, 1358, 1252, 1212, 1060, 932. Characteristic NMR frequencies (D$_2$O): H–6 8.61 (J=7.5 c.p.s.), H–5 7.09 (7.5), H–1' 715 (5.5) and H–2' 6.24 (5.5) p.p.m.

Example II.—Preparation of aracytidine-3' phosphate from O$^2$,2'-cyclocytidine-3' phosphate When O$^2$,2'-cyclocytidine-3' phosphate is titrated with dilute NaOH or KOH to pH 10, a quantitative conversion to aracytidine-3' phosphate (Formula III) takes place. On electrophoresis at pH 7 and in several paper chromatographic systems, aracytidine-3' phosphate is indistinguishable from cytidine-2',(3') phosphate. The zwitter-ionic form can be obtained by absorbing the dianionic form on Dowex 1-X8 (formate) resin, eluting with dilute (0.05 N) formic acid and subsequent freeze drying. The UV spectrum at pH 4.5 shows $\lambda_{max}$ at 274 m$\mu$ ($\epsilon$=10,600), and at pH 1 $\lambda_{max}$ at 279 m$\mu$ ($\epsilon$=13,800). Characteristic NMR signals (p.p.m., D$_2$O): H–6 8.49 (J=8 c.p.s.), H–5 6.66 (J=8) and H–1 6.60 (J=3); spectrum taken on Varian HA100 instrument at 100 mHz. with tetramethyl silane as external standard.

Example III.—Preparation of aracytidine-3' phosphate directly

The thermal conversion is carried out as described in Example I for the preparation O$^2$,2'-cyclocytidine-3' phosphate, but instead of the addition of ice alone the reaction mixture is slowly mixed with a mixture of ice and KOH. The resulting solution (pH 13) is applied to a 2.5 x 30 cm. Dowex 1-X8 (formate) column, washed with water and eluted with 0.02 N formic acid. Aracytidine-3' phosphate was obtained in 90% yield based on cytidine-2',3'-cyclic phosphate.

I claim:
1. O$^2$,2'-cyclocytidine-3' phosphate.
2. A process for preparing O$^2$,2'-cyclocytidine-3' phosphate which consists essentially of heating a mixture of cytidine-2',3' cyclic phosphate in the form of its tri-n-butyl ammonium salt in a non-protolytic solvent with an excess of a tertiary organic base to a temperature of 40°–120° C. while adding an excess of a lower alkyl silylating agent, cooling the mixture and recovering the crystalline product.
3. The process of claim 2 wherein said non-protolytic solvent is selected from the group consisting of pyridine, dioxane, dimethyl formamide and dimethyl sulfoxide.
4. The process of claim 3 wherein said alkyl silylating agent is trimethylsilyl chloride.
5. A process for preparing aracytidine-3' phosphate by thermal conversion which consists essentially of heating a mixture of cytidine-2',3' cyclic phosphate in the form of its tri-n-butyl ammonium salt in a non-protolytic solvent with an excess of a tertiary organic base to a temperature of 40°–120° C. while adding an excess of a lower alkyl silylating agent, cooling the mixture, adding a strong inorganic base until the pH of the mixture is 13, and recovering the crystalline product.
6. The process of claim 5 wherein said non-protolytic solvent is selected from the group consisting of pyridine, dioxane, dimethyl formamide, and dimethyl sulfoxide.
7. The process of claim 6 wherein said lower alkyl silylating agent is trimethylsilyl chloride.
8. A process for preparing aracytidine-3' phosphate which consists essentially of titrating O$^2$,2'-cyclocytidine-3' phosphate with a strong inorganic base to a pH of 10 and recovering the crystalline product.
9. The process of claim 8 wherein said strong inorganic base is selected from the group consisting of NaOH and KOH.

References Cited
UNITED STATES PATENTS 3,463,772   8/1969   Nagyvary _____ 260—211.5 R
3,463,850   8/1969   Shen et al. _____ 260—211.5 R

OTHER REFERENCES

Wolfrom et al.: Advances in Carbohydrates," vol. 22, 1967, Academic Press, New York, pp. 354, 368–369.

LEWIS GOTTS, Primary Examiner

J. R. BROWN, Assistant Examiner

U.S. Cl. X.R.

260—999